United States Patent
Zhang et al.

(10) Patent No.: US 12,038,805 B1
(45) Date of Patent: Jul. 16, 2024

(54) HARD ERROR TRACKER AND HRR DYNAMIC REORDERING

(71) Applicant: SK hynix Inc., Gyeonggi-do (KR)

(72) Inventors: Fan Zhang, San Jose, CA (US); Meysam Asadi, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/098,449

(22) Filed: Jan. 18, 2023

(51) Int. Cl.
*G11C 29/00* (2006.01)
*G06F 11/07* (2006.01)
*G06F 11/10* (2006.01)

(52) U.S. Cl.
CPC ........ *G06F 11/1048* (2013.01); *G06F 11/076* (2013.01); *G06F 11/1076* (2013.01)

(58) Field of Classification Search
None
See application file for complete search history.

(56) References Cited

U.S. PATENT DOCUMENTS

| | | | |
|---|---|---|---|
| 2019/0163592 A1* | 5/2019 | Camp | G06F 3/0688 |
| 2019/0286516 A1 | 9/2019 | Jacobvitz et al. | |
| 2020/0133501 A1* | 4/2020 | Lee | G06F 3/0673 |
| 2021/0065813 A1* | 3/2021 | Papandreou | G11C 16/3404 |
| 2021/0357289 A1 | 11/2021 | Kurose et al. | |
| 2022/0100395 A1* | 3/2022 | Kim | G11C 29/42 |

\* cited by examiner

*Primary Examiner* — Samir W Rizk
(74) *Attorney, Agent, or Firm* — IP & T GROUP LLP

(57) ABSTRACT

A memory system for detecting hard errors. The memory system has a first memory block and a second memory block and a memory controller in communication with the first memory block, The memory controller includes a hard error tracker module comprising hardware configured to track over time fail bit counts from data read from the first memory block and includes a hard error percentage module programmed to determine, based on the fail bit counts, hard error percentages for the data read from the first memory block. The hard error percentage module is programmed to dynamically reorder historical read retry (HRR) entries for subsequent data reads, based on a page type of the data being read and the hard error percentages determined during reading of data from the memory block.

20 Claims, 9 Drawing Sheets

FIG. 8

- Hard_err_cnt=0 //total hard error count
- Hard_err_cnt_per_ar_0to1 = [0,...0] //hard error count per AR pattern
- Hard_err_cnt_per_ar_1to0 = [0,...0] //hard error count per AR pattern
- Hard_err_cnt_per_ar = [0,...0] //hard error count per AR pattern
- Total_err_cnt=0
- Total_err_cnt_per_ar_0to1 = [0,...0]
- Total_err_cnt_per_ar_1to0 = [0,...0]
- Total_err_cnt_per_ar = [0,...0]
- Hard_err_percent=0
- Hard_err_cnt_per_ar_0to1 = [0,...0]
- Hard_err_cnt_per_ar_1to0 = [0,...0]
- Hard_err_cnt_per_ar = [0,...0]
- For ar in AR:
    - Hard_err_cnt_per-ar_0to1[ar] = C(7->1,ar)
    - Hard_err_cnt_per-ar_1to0[ar] = C̄(0->0,ar)

- Hard_err_cnt_per_ar[ar] = Hard_err_cnt_per_ar_0to1[ar]+ Hard err cnt per ar 1to0[ar]
    - Hard_err_cnt = Hard_err_cnt + Hard_err_cnt_per_ar[ar]
    - For hd in [0,1]
        - For bin label in [0,1,2,3]
            - Total_err_cnt_per_ar_1to0[ar]-C(bin_label->0,ar)
        - For bin label in [4,5,6,7]
            - Total_err_cnt_per_ar_0to1[ar]-C(bin_label->1,ar)
        - Total_err_cnt_per_ar[ar] = Total_err_cnt_per_ar_1to0[ar]+ Total err cnt per ar 0to1[ar]
    - Total_err_cnt = Total_err_cnt + Total_err_cnt_per_ar[ar]
- For ar in AR:
    - Hard_err_percent_per_ar[ar] hard_err_cnt_per_ar[ar]/Total_err_cnt_per_ar[ar]
    - Hard_err_percent_per_ar_0to1 [ar] = hard_err_cnt_per_ar_0to1 [ar]/total_err_cnt_per_ar_0to1 [ar]
    - Hard_err_percent_per_ar_1to0 [ar] = hard_err_cnt_per_ar_1to0 [ar]/total err cnt per ar 1to0 [ar]
- Hard_err_percent = hard_err_cnt/total_err_cnt

HARD ERROR TRACKER AND HRR DYNAMIC REORDERING

BACKGROUND

1. Field

Embodiments of the present disclosure relate to a memory system for monitoring hard error occurrences.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

The SSD may include flash memory components and a controller, which includes the electronics that bridge the flash memory components to the SSD input/output (I/O) interfaces. The SSD controller may include an embedded processor that executes functional components such as firmware. The SSD functional components are typically device specific, and in most cases, can be updated.

The two main types of flash memories are named after the NAND and NOR logic gates. The individual flash memory cells exhibit internal characteristics similar to those of their corresponding gates. The NAND-type flash memory may be written to and read from in blocks (or pages) which are generally much smaller than the entire memory space. The NOR-type flash memory allows a single machine word (byte) to be written to an erased location or read independently. The NAND-type flash memory operates primarily in memory cards, USB flash drives, solid-state drives (SSDs), and similar products, for general storage and transfer of data.

There are two kinds of errors in data (words) stored in a memory. One is a temporary error, such as a soft error, which can be corrected in the memory by writing back (rewriting) the corrected data. The other is a hard error which cannot be corrected in the memory by rewriting the corrected data. A hard error may occur because of a faulty cell in the memory (e.g., a cell is stuck at "1" or "0"). In the case of a hard error, an error occurs every time that the bad bit is accessed.

SUMMARY

In one embodiment of the present invention, there is provided a memory system for detecting hard errors. The memory system has a first memory block and a second memory block and a memory controller in communication with the first memory block. The memory controller includes a hard error tracker module comprising hardware configured to track over time fail bit counts from data read from the first memory block and includes a hard error percentage module programmed to determine, based on the fail bit counts, hard error percentages for the data read from the first memory block. The hard error percentage module is programmed to dynamically reorder historical read retry (HRR) entries for subsequent data reads, based on a) a page type of the data being read and b) the hard error percentages determined during reading of data from the memory block.

In one embodiment of the present invention, there is provided a method for tracking hard errors. The method reads data from the memory block; tracks over time fail bit counts of the data read from the memory block using a hardware-based hard error tracker module; based on the fail bit counts, determines hard error percentages for the data read from the memory block using a programmed hard error percentage module; and dynamically reorders historical read retry (HRR) entries, for subsequent data reads, based a) on a page type of the data being read and b) the hard error percentages determined during reading of data from the memory block.

Additional aspects of the present invention will become apparent from the following description.

BRIEF DESCRIPTION OF THE DRAWINGS

FIG. 8 is a schematic showing program code for detecting hard errors in accordance with still another embodiment of the present invention.

DETAILED DESCRIPTION

Figure 1:
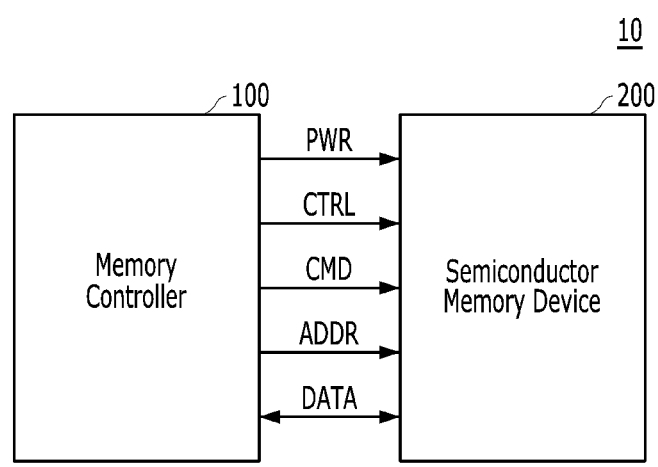
FIG. 1 is a block diagram illustrating a memory system in accordance with one embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this conveys the scope of the present invention to those skilled in the art. Moreover, reference herein to "an embodiment," "another embodiment," or the like is not necessarily to only one embodiment, and different references to any such phrases are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The invention encompasses numerous alternatives, modifications and equivalents to the disclosed embodiments. Numerous specific details are set forth in the following description in order to provide a thorough understanding of the invention. These details are provided for the purpose of example; the invention may be practiced without some or all of these specific details. For clarity, technical material that is known in technical fields related to the invention has not been described in detail so that the invention is not unnecessarily obscured.

FIG. 1 is a block diagram schematically illustrating a memory system in accordance with one embodiment of the present invention.

Referring to FIG. 1, the memory system 10 may include a memory controller 100 and a semiconductor memory device 200, which may represent more than one such device. The semiconductor memory device(s) 200 may be flash memory device(s), particularly of the NAND-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as for example a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
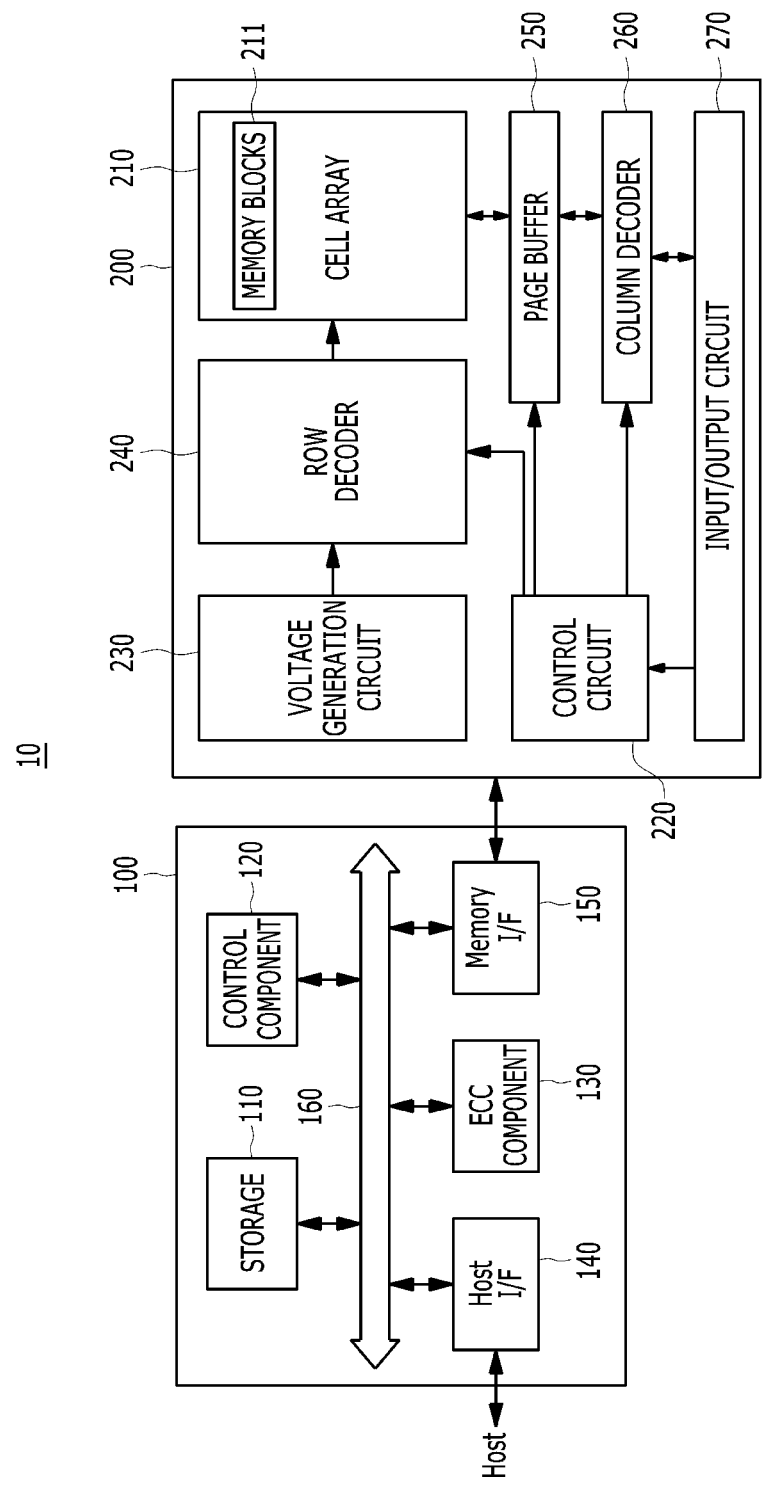
FIG. 2 is a block diagram illustrating a memory system in accordance with another embodiment of the present invention.

FIG. 2 is a detailed block diagram illustrating a memory system in accordance with another embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as for example a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as for example a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as for example a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and write and read operations for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In some embodiments, the ECC component 130 may perform an error correction operation based on coded modulation techniques such as for example a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM). As such, the ECC component 130 may include circuits, systems or devices for suitable error correction operation. In particular, the ECC component 130 may include an encoder and an LDPC decoder, e.g., a single LDPC chip-kill decoder.

The host interface 140 may communicate with the host device through one or more of various interface protocols such as for example a universal serial bus (USB), a multimedia card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as erase and pass voltages.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
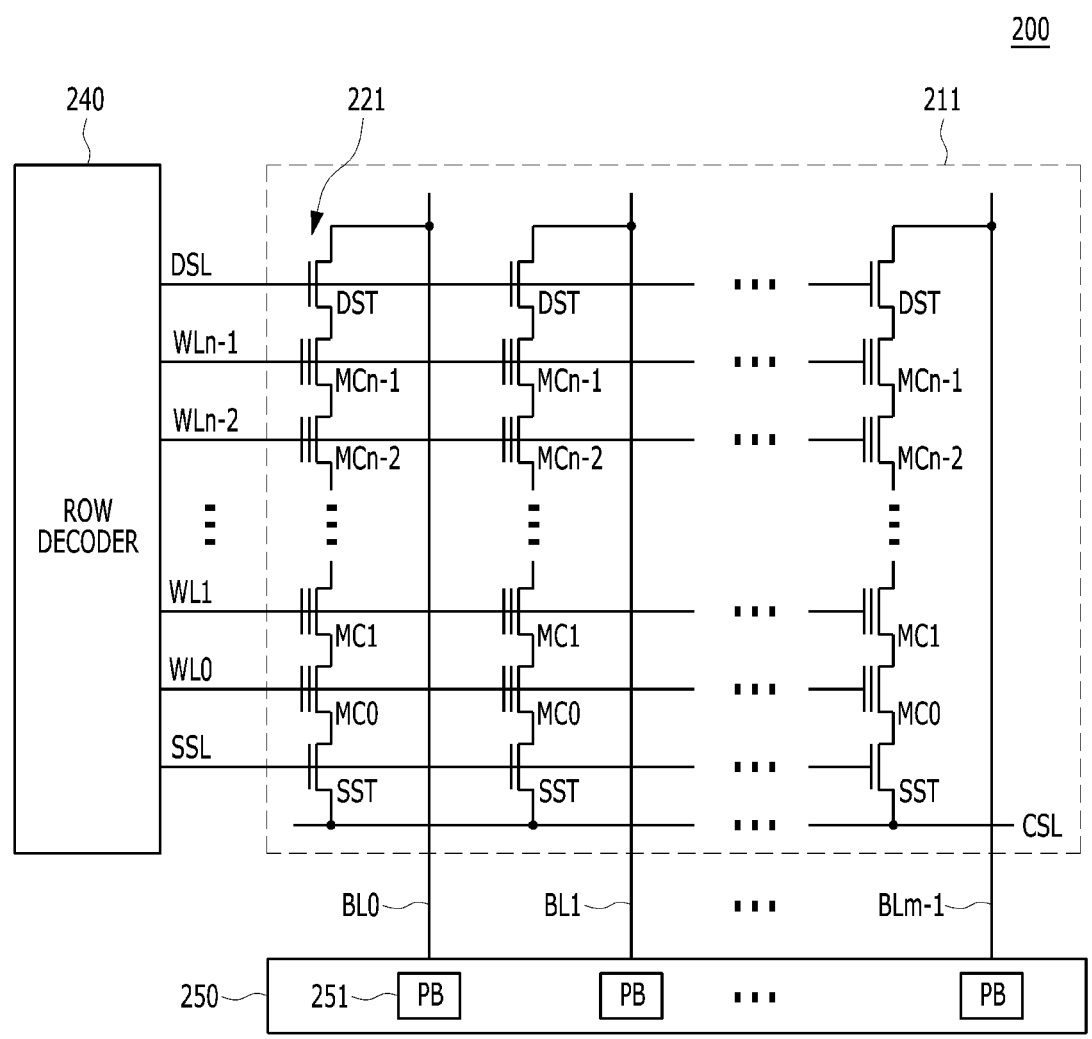
FIG. 3 is a circuit diagram illustrating a memory block of a memory device of a memory system in accordance with still another embodiment of the present invention.

The page buffer 250 may be in electrical communication with the memory cell array 210 through bit lines BL (shown in FIG. 3). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with another embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer 250 may include a plurality of separate page buffers PB 251 that are coupled to the bit lines BL0 to BLm−1. The page buffers PB 251 may operate in response to page buffer control signals. For example, the page buffers PB 251 may temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
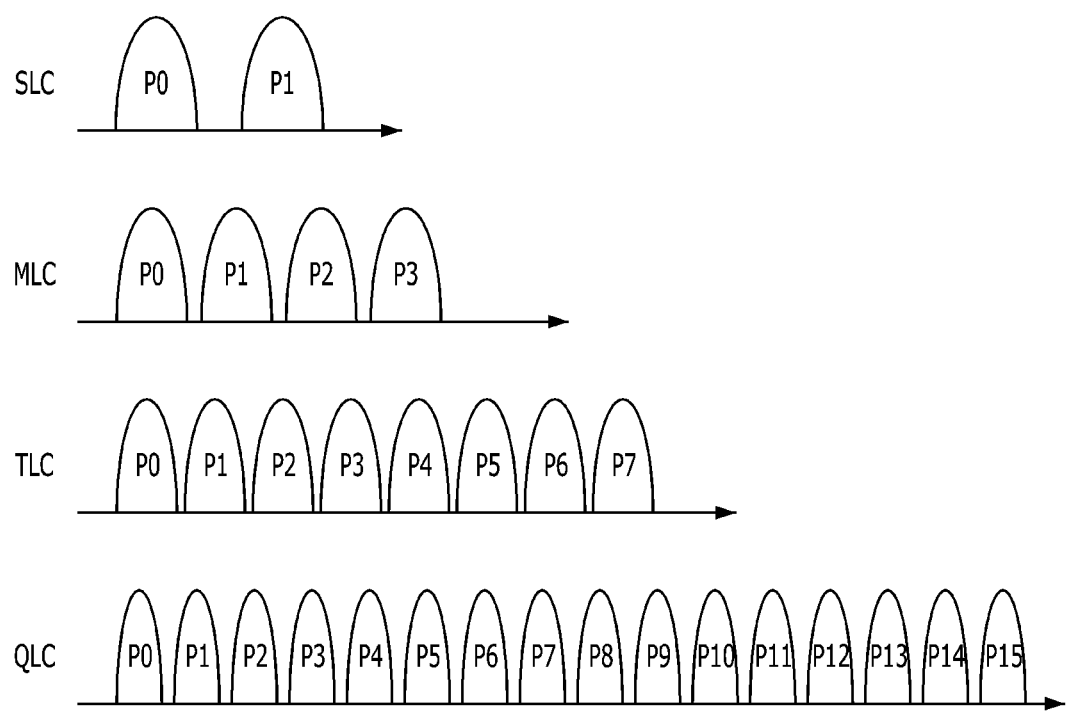
FIG. 4 is a diagram illustrating distributions of states for different types of cells of a memory device.

FIG. 4 is a diagram illustrating distributions of states or program voltage (PV) levels for different types of cells of a memory device. Referring to FIG. 4, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 10 such as SSD.

Figure 5A:
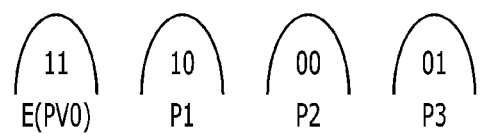
FIG. 5A is a diagram illustrating an example of Gray coding for a multi-level cell (MLC).

FIG. 5A is a diagram illustrating an example of coding for a multi-level cell (MLC).

Referring to FIG. 5A, an MLC may be programmed using a set coding. An MLC may have 4 program states, which include an erased state E (or PV0) and a first program state PV1 to a third program state PV3. The erased state E (or PV0) may correspond to "11." The first program state PV1 may correspond to "10." The second program state PV2 may correspond to "00." The third program state PV3 may correspond to "01."

Figure 5B:
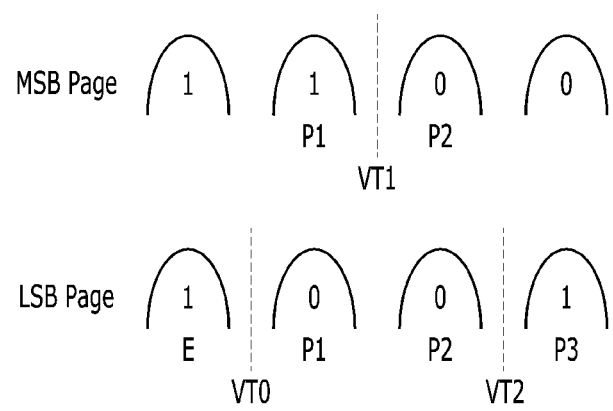
FIG. 5B is a diagram illustrating state distributions for pages of a multi-level cell (MLC).

In the MLC, as shown in FIG. 5B, there are 2 types of pages including LSB and MSB pages. 1 or 2 thresholds may be applied in order to retrieve data from the MLC. For an MSB page, the single threshold value is VT1. VT1 distinguishes between the first program state PV1 and the second program state PV2. For an LSB page, 2 thresholds include a threshold value VT0 and a threshold value VT2. VT0 distinguishes between the erased state E and the first program state PV1. VT2 distinguishes between the second program state PV2 and the third program state PV3.

Figure 6A:
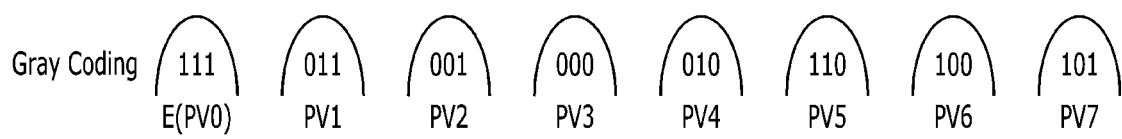
FIG. 6A is a diagram illustrating an example of Gray coding for a triple-level cell (TLC).

FIG. 6A is a diagram illustrating an example of Gray coding for a triple-level cell (TLC).

Referring to FIG. 6A, a TLC may be programmed using Gray coding. A TLC may have 8 program states, which include an erased state E (or PV0) and a first program state PV1 to a seventh program state PV7. The erased state E (or PV0) may correspond to "110." The first program state PV1 may correspond to "011." The second program state PV2 may correspond to "001." The third program state PV3 may correspond to "000." The fourth program state PV4 may correspond to "010." The fifth program state PV5 may correspond to "110." The sixth program state PV6 may correspond to "100." The seventh program state PV7 may correspond to "101."

Figure 6B:
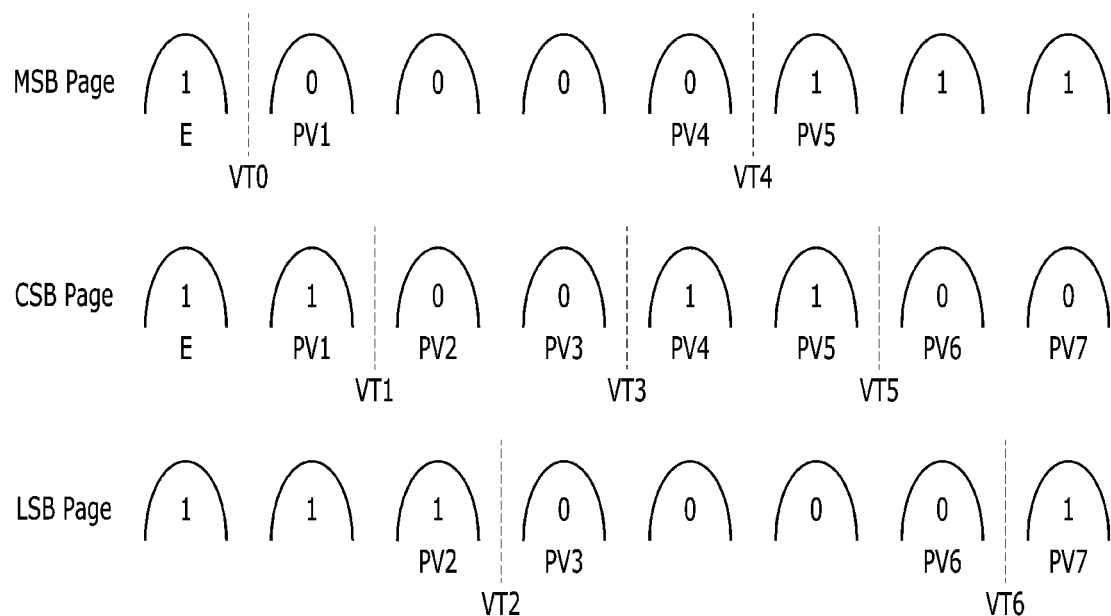
FIG. 6B is a diagram illustrating state distributions for pages of a triple-level cell (TLC).

In the TLC, as shown in FIG. 6B, there are 3 types of pages including LSB, CSB and MSB pages. 2 or 3 thresholds may be applied in order to retrieve data from the TLC. For an MSB page, 2 thresholds include a threshold value VT0 that distinguishes between an erase state E and a first program state PV1 and a threshold value VT4 that distinguishes between a fourth program state PV4 and a fifth program state PV5. For a CSB page, 3 thresholds include VT1, VT3 and VT5. VT1 distinguishes between a first program state PV1 and a second program state PV2. VT3 distinguishes between a third program state PV3 and the fourth program state PV4. VT5 distinguishes between the fourth program state PV5 and the sixth program state PV6. For an LSB page, 2 thresholds include VT2 and VT6. VT2 distinguishes between the second program state PV2 and the third program state PV3. VT6 distinguishes between the sixth program state PV6 and a seventh program state PV7.

After a memory array including a plurality of memory cells is programmed as described in FIGS. 5A and 6A, when a read operation is performed on the memory array using a certain voltage reference value such as a read threshold (i.e., read voltage level), the electrical charge levels of the memory cells (e.g., threshold voltage levels of transistors of memory cells) are compared to one or more voltage reference values (also called "read voltage level" or "read threshold") to determine the state of individual memory cells. When a certain read threshold is applied to the memory array, those memory cells that have threshold voltage levels higher than the certain voltage reference value are turned on and detected as "on" cells, whereas those memory cells that have threshold voltage levels lower than the certain voltage reference value are turned off and detected as "off" cells, for example. Therefore, each read threshold is arranged between neighboring threshold voltage distribution windows corresponding to different programmed states so that each read threshold can distinguish such programmed states by turning on or off the memory cell transistors.

When a read operation is performed on memory cells in a data storage device using MLC technology, the threshold voltage levels of the memory cells are compared to more than one read threshold level to determine the state of individual memory cells. Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors. For example, as program/erase cycles increase, the margin between neighboring threshold voltage distributions of different programmed states decreases and eventually the distributions start overlapping. As a result, the memory cells with threshold voltages that fall within the overlapping range of the neighboring distributions may be read as being programmed to a value other than the original targeted value and thus cause read errors. Such read errors may be managed in most situations by using error correction codes (ECC). When the number of bit errors on a read operation exceeds the ECC correction capability of the data storage, the read operation fails.

Error information may be provided by fail bit counts (FBC) obtained from decoding read data from a memory device using the read threshold voltage set. While the present invention is not limited to using a deep neural network DNN for an error recovery algorithm, a DNN may derive optimal read thresholds associated with the operating conditions of a NAND. In general, the error recovery algorithm may record and update the last successful read threshold as a set of historical read threshold voltages. Yet, optimal read threshold voltage may frequently change depending on various factors including the condition or state of the memory device.

If one of the historical read threshold voltages fail, then a history-read retry (HRR) operation will be performed. The HRR operation includes a series of pre-determined Vt thresholds that remain the same across time, and do not change as a function of NAND condition or physical location of the data. Typically, there are 5 to 10 HRR operations (or read attempts) performed before moving to a subsequent step in the data recovery operation.

Frequent changes in the read threshold voltages or frequent attempts to derive optimal read thresholds when there are hard errors present can result in more transmissions between the controller and the memory device of may increase the overall read latency, thereby degrading quality of service (QoS) of read operations of the memory system.

Hard Errors in SSD

The complexities noted above are compounded in penta-level (PLC) NAND which stores 5 bits or 32 states per cell and the percentage of hard error is expected to be higher than for TLC/QLC. In existing SSD products, a FBC metric is typically used to predict degradations of the PV distributions (detailed above) and hence to predict possible decoding failure.

Figure 7:
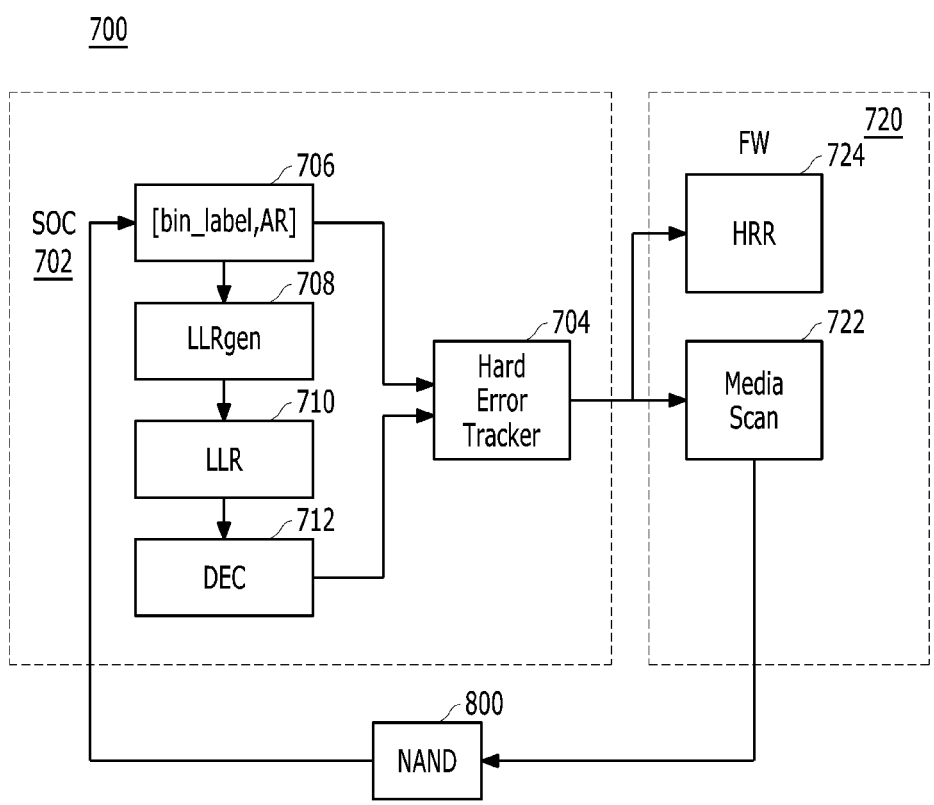
FIG. 7 is a schematic showing an exemplary system of the present invention for tracking hard errors in accordance with yet another embodiment of the present invention.

The present invention was made with the recognition that reliability degradation is related to both of the hard error percentage and FBC, rather than FBC alone. Accordingly, in one embodiment of the present invention, there is provided (as shown in FIG. 7) a hard error tracker system 700 comprising a hardware error tracker module 704 configured to track not only fail bit counts but also a hard error percentage of the fail bit counts. In one embodiment of the present invention, hard error percentage information is used to reorder the history-read retry (HRR) entries dynamically during the reading of data from the memory block because the failure mechanism can be determined by page type and the hard error percentage. For example, in NAND, the hard errors in a LSB page are often caused by retention failures, and hard errors in a MSB page are caused by read disturbances. The inventive hardware module and the inventive firmware (FW) error prevention schemes help ensure both performance/QoS and reliability by having HRR entries with lower hard error percentages moved to the top of the list.

The reliability depends on three factors: NAND PV distribution, where the read biases are placed, and the ECC soft decoder's correction capability.

In one embodiment of the present invention, a hard error can be identified when, during a soft read, a cell's voltage falls out of an expected soft range around an optimal read threshold (see Table. 1), and the sign is incorrect. Error bits with a wrong sign and a maximum magnitude may cause significant degradation to the correction capability in soft decoding.

TABLE 1

| Definition of Soft Range | |
|---|---|
| Block Type | Soft Range (around optimal read threshold) |
| SLC | ±400 mV |
| MLC | ±400 mV |
| TLC | ±250 mV |

It is known that when there are hard errors, the soft decoder's correction capability is significantly degraded. One example is that when all errors are hard errors, the soft decoder will have the same correction capability as a hard decoder. In other words, for a FBC=400 with no hard errors, the data read from a page of a memory may be decodable. While for the same FBC=400 but having 50 bits of hard errors, there may be decoding failure of the data read from a page of a memory. Table. 2 shows the degradation of soft decoder's correction capability when there are different percentages of hard errors in existence.

TABLE 2 shows a correction degradation with higher percentage(s) of hard errors. In table 2, "spare percentage" is the ratio between the number of additional cells (in addition to the number of host bits stored) and the total number of cells in a physical page of a NAND flash memory.

| Hard Errors Percentage | Equivalent BCH correction capability/max NAND RBER | | |
|---|---|---|---|
| | Spare Percentage between 6% and 8% | Spare Percentage between 8% and 10% | Spare Percentage over 10% |
| Up to 10% | 200% | 210% | 220% |
| 20% | 160% | 180% | 200% |
| 30% | 140% | 160% | 180% |
| 40% | 120% | 140% | 160% |
| 50% | 110% | 125% | 140% |
| 60% | 100% | 110% | 120% |

Accordingly, the present invention recognized that FBC alone is not sufficient to be used as an indicator for possible reliability violations and/or is not sufficient to be used as an indicator for the necessity for data relocation of parts or the whole of contents from a memory block (e.g., a super block) having hard errors to another memory block. Instead, in one embodiment of the present invention both FBC and a predefined number of hard errors are utilized to determine whether data needs to be relocated.

Inventive Error Recovery

To keep track of the hard error percentage, the hard error tracker system 700 with hardware error tracker module 704 is used in a system on chip SoC 702 configuration as shown in FIG. 7 for tracking errors in reading data from NAND 800.

Hard Error Tracker Module

As shown in FIG. 7 for the hard error tracker system 700, hard error tracker 704, [bin_label, AR] array 706, log likelihood (LLR) generator module 708, LLR-HD pattern counter 710, and decoder 712 are provided on SoC 702. Here, a hard decision HD from a decoder is output, and the counter (referred to herein as a LLR-HD pattern counter) is calculated based on the LLR and the decoder output. The LLR-HD pattern counter 710 has separate counters used to count the number of cells going from different LLR bin_label and assist-read (AR) to 0 and 1 at an output of decoder 712. For example, assume the bin_label goes from 0 to 7 (for a "7 reads" case) and the AR values range from 0 to 2. A typical [bin_label, AR] array for the 7 reads example is as below.

[(0,0), (6,1), (7,1), (2,1), (5,1), (2,2), (3,0)]

The [bin_label, AR] array 706 is used as input to the LLR generator module 708. The AR bits are used to select 1 lookup table (LUT) out of 3, and the LUT is used to map bin_label to LLR values ranging from [−3, −2, −1, 0, 1, 2, 3]. In a TLC NAND, each page may have 2 or 3 read thresholds depending on page type. Here, in this example, a MSB or CSB page (either of which has 3 read thresholds needing three LUTs) and the AR bits (by way of the selected look-up table for the particular page type) can be used to determine which threshold a particular cell is at.

Assume for this explanation that the LLR for the 7 reads is [−2, 3, 3, −1, 1, 0, 0]. This set of LLRs is fed into the decoder 712. After decoding, the output is [1, 0, 0, 0, 0, 1, 1].

The hard error tracker module 702 containing a series of counters C identifying soft errors present may produce an output as below in the decoded output. Here in the exemplary counters below, $C(X \rightarrow Y, Z) = W$, where X is the bin_label, Y is the HD value at the decoder output, Z is AR value, and W is the count.

$C(0 \rightarrow 0,0)=0$
$C(1 \rightarrow 0,0)=0$
$C(2 \rightarrow 0,0)=0$
$C(3 \rightarrow 0,0)=0$
$C(4 \rightarrow 0,0)=0$
$C(5 \rightarrow 0,0)=0$
$C(6 \rightarrow 0,0)=0$
$C(7 \rightarrow 0,0)=0$
$C(0 \rightarrow 1,0)=1$
$C(1 \rightarrow 1,0)=0$
$C(2 \rightarrow 1,0)=0$
$C(3 \rightarrow 1,0)=1$
$C(4 \rightarrow 1,0)=0$
$C(5 \rightarrow 1,0)=0$
$C(6 \rightarrow 1,0)=0$
$C(7 \rightarrow 1,0)=0$
$C(0 \rightarrow 0,1)=0$
$C(1 \rightarrow 0,1)=0$
$C(2 \rightarrow 0,1)=1$
$C(3 \rightarrow 0,1)=0$
$C(4 \rightarrow 0,1)=0$
$C(5 \rightarrow 0,1)=1$
$C(6 \rightarrow 0,1)=1$
$C(7 \rightarrow 0,1)=1$
$C(0 \rightarrow 1,1)=0$
$C(1 \rightarrow 1,1)=0$
$C(2 \rightarrow 1,1)=0$
$C(3 \rightarrow 1,1)=0$
$C(4 \rightarrow 1,1)=0$
$C(5 \rightarrow 1,1)=0$
$C(6 \rightarrow 1,1)=0$
$C(7 \rightarrow 1,1)=0$
$C(0 \rightarrow 0,2)=0$
$C(1 \rightarrow 0,2)=0$
$C(2 \rightarrow 0,2)=0$
$C(3 \rightarrow 0,2)=0$
$C(4 \rightarrow 0,2)=0$
$C(5 \rightarrow 0,2)=0$
$C(6 \rightarrow 0,2)=0$
$C(7 \rightarrow 0,2)=0$
$C(0 \rightarrow 1,2)=0$
$C(1 \rightarrow 1,2)=0$
$C(2 \rightarrow 1,2)=1$
$C(3 \rightarrow 1,2)=0$
$C(4 \rightarrow 1,2)=0$
$C(5 \rightarrow 1,2)=0$
$C(6 \rightarrow 1,2)=0$
$C(7 \rightarrow 1,2)=0$ Hard Error Detection As shown in FIG. 7 for hard error tracker system 700, there is also provided a software or firmware (FW) module 720 having a media scan module 722 and a HRR module 724. In the media scan module 722, there is program code which detects hard errors based on the counters and the counter values reported from hard error tracker module 702 in SoC. One exemplary algorithm is shown in the program code depicted in FIG. 8. Here, the program counts errors by counting errors from three array bins, calculates the total error by counting the total errors from three array bins, and calculates a hard error percentage by counting hard errors from three array bins. Afterwards, the program code counts the hard error count per AR pattern and also C(X→Y,Z)=W for all combinations of X, Y and Z).

HRR Adjustment From an array of determined hard error percentages (e.g., hard_err_percent_per_ar determined by the program code in media scan module 722), the hard error percentage of each page type (e.g., LSB/CSB/MSB) is determined. With Gray coding (as described above) in a NAND, the MSB is often subject to read disturb type of error, and the LSB is often subject to a retention type of error. If the MSB shows a growing percentage of hard error (e.g., the hard_err_percent in the program code of FIG. 8 is increasing), a read disturb specific RRT entry can be moved to a historical read list or to the top of MSB's HRR list. If LSB shows growing hard error percentage, a retention specific RRT entry can be moved to a historical read list or to the top of LSB's HRR list. CSB is usually not sensitive to disturb or retention types of errors. In general, the hard error tracker 704 can provide diagnostic information to help understand what potential errors types are developing so that preventive action can be taken in the early stage(s), such as for example recycling the whole block.

Hard Error Processing

Figure 9:
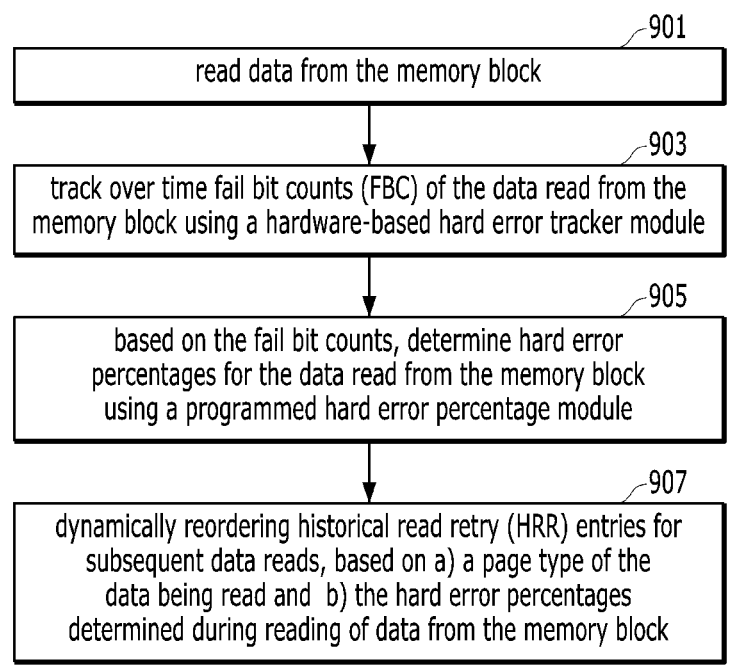
FIG. 9 is a flowchart depicting an exemplary method of the present invention for tracking hard errors in accordance with another embodiment of the present invention.

FIG. 9 illustrates a flowchart for an exemplary method for tracking hard errors. The method illustrated in FIG. 9 begins at 901 by reading data from the memory block. At 903, the method continues by tracking over time fail bit counts (FBC) of the data read from the memory block using a hardware-based hard error tracker module. At 905, the method continues by determining hard error percentages for the data read from the memory block using a programmed hard error percentage module based on the fail bit counts. At 907, the method continues by dynamically reordering historical read retry (HRR) entries, for subsequent data reads, based on a) a page type of the data being read and b) the hard error percentages determined during reading of data from the memory block.

In this method, a set of log likelihood ratios LLRs can be determined for decoding the data read from the memory block and the data read from the memory block can be decoded. In this method, the LLRs are based on a look up table which determines the set of LLRs to use based on assist-read bits associated with a page-type of the data read from the memory block.

In this method, soft errors present in the decoded data are identified and counted in the hardware-based hard error tracker module. Furthermore, in the programmed hard error percentage module, hard errors can be detected based on a) the soft errors counted and b) the page type of the data being read. Furthermore, read retry voltages used in reading the data from the memory block) can be recorded over time, and a growing number of the hard errors for each page type in the memory block can be determined based on a decoding failure of the read retry voltages to read the data from the memory block. In this method, in response to identifying a hard error in the memory block, parts or a whole of the memory block can be relocated to another memory block.

In another embodiment of the present invention, there is provided a memory system for detecting hard errors. The memory system (such as for example the memory system 10 in FIGS. 1 and 2) has a first memory block and a second memory block (such as for example the memory blocks 211 in FIG. 2); and a memory controller (such as for example the control circuit 220 in FIG. 2) in communication with the first and second memory blocks. The memory controller includes a hard error tracker module (such as for example hard error tracker 704 shown in FIG. 7) comprising hardware configured to track over time fail bit counts (FBC) from data read from the first memory block, and includes a hard error percentage module (such as for example HRR module 724 shown in FIG. 7) programmed to determine hard error percentages for the data read from the first memory block and to dynamically reorder historical read retry (HRR) entries for subsequent data reads, based on a) a page type of the data being read and b) the hard error percentages determined during reading of data from the memory block.

In this system, the hard error tracker module can be included with a system on chip SoC including a log likelihood ratio (LLR) generator module, a LLR-HD pattern counter, and a decoder. In this system, the LLR generator is provided with an assist read array containing assist-read bits associated with a page-type of the data read from the memory block, and the LLR generator (based on the assist-read bits) selects a look up table which determines a set of LLRs, and the set of LLRs is provided to the decoder to decode the data read from the first memory block. The LLR-HD pattern counter may utilize plural counters for identifying and counting soft errors present in the decoded data.

In this system, the hard error percentage module may comprise a media scan module programmed to detect hard errors based on the soft errors counted by the LLR-HD pattern counter. The media scan module can determine based on the soft errors counted existence of hard errors in the read data from the first memory block. The media scan module may determine the existence of the hard errors based on the hard error percentages for the page type of the data being read from the first memory block. In this system, the page type may include one or more of least significant bit pages, center significant bit pages, and most significant bit pages.

In this system the hard error percentage module may comprise a historical read retry HRR module recording over time read retry voltages used in reading the data from the first memory block. The historical read retry HRR module can determine a growing number of the hard errors for each page type in the first memory block based on failure of the read retry voltages to read the data from the first memory block.

In this system, the memory controller, in response to identifying a hard error in the first memory block, may relocate parts or a whole of the first memory block to the second memory block.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "system" or "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

What is claimed is:

1. A memory system for detecting hard errors, comprising:
   a first memory block and a second memory block; and
   a memory controller in communication with the first and second memory blocks,
   wherein the memory controller includes:
   a hard error tracker module comprising hardware configured to track over time fail bit counts from data read from the first memory block; and
   a hard error percentage module programmed to determine, based on the fail bit counts, hard error percentages for the data read from the first memory block and to dynamically reorder historical read retry (HRR) entries for subsequent data reads, based on a) a page type of the data being read and b) the hard error percentages determined during reading of data from the memory block.

2. The memory system of claim 1, wherein the hard error tracker module is included with a system on chip SoC including a log likelihood ratio (LLR) generator module, a LLR-HD pattern counter, and a decoder.

3. The memory system of claim 2, wherein
   the LLR generator is provided with an assist read array containing assist-read bits associated with the page-type of the data read from the memory block, and
   the LLR generator based on the assist-read bits selects a look up table which determines a set of LLRs, and
   the set of LLRs is provided to the decoder to decode the data read from the first memory block.

4. The memory system of claim 3, wherein the LLR pattern counter utilizes plural counters for identifying and counting soft errors present in the decoded data.

5. The memory system of claim 4, wherein the hard error percentage module comprises a media scan module programmed to detect hard errors based on the soft errors counted by the LLR pattern counter.

6. The memory system of claim 5, wherein the media scan module is configured to determine, based on the soft errors counted and the page type, existence of hard errors in the read data from the first memory block.

7. The memory system of claim 6, wherein the page type includes one or more of least significant bit pages, center significant bit pages, and most significant bit pages.

8. The memory system of claim 7, wherein the hard error percentage module comprises a historical read retry HRR module recording over time read retry voltages used in reading the data from the first memory block.

9. The memory system of claim 8, wherein the historical read retry HRR module determines a growing number of the hard errors for each page type in the first memory block based on a decoding failure of the read retry voltages to read the data from the first memory block.

10. The memory system of claim 9, wherein the memory controller, in response to identifying a hard error in the first memory block, relocates parts or a whole of the first memory block to the second memory block.

11. A method for tracking hard errors in a memory block, comprising:
    reading data from the memory block;
    tracking over time fail bit counts of the data read from the memory block using a hardware-based hard error tracker module;
    based on the fail bit counts, determining hard error percentages for the data read from the memory block using a programmed hard error percentage module; and
    dynamically reordering historical read retry (HRR) entries for subsequent data reads, based on a) a page type of the data being read and b) the hard error percentages determined during reading of data from the memory block.

12. The method of claim 11, further comprising:
determining a set of log likelihood ratios LLRs for decoding the data read from the memory block; and
decoding the data read from the memory block.

13. The method of claim 12, wherein the LLRs are based on a look up table which determines the set of LLRs based on assist-read bits associated with the page-type of the data read from the memory block.

14. The method of claim 12, further comprising:
in the hardware-based hard error tracker module, identifying and counting soft errors present in the decoded data.

15. The method of claim 14, further comprising:
in the programmed hard error percentage module, detecting hard errors based on the soft errors counted in the decoded data.

16. The method of claim 15, further comprising:
determining, based on the soft errors counted in the decoded data and the page type, existence of hard errors in the data read from the memory block.

17. The method of claim 16, wherein the page type includes one or more of least significant bit pages, center significant bit pages, and most significant bit pages.

18. The method of claim 17, further comprising:
recording over time read retry voltages used in reading the data from the memory block.

19. The method of claim 18, further comprising:
determining for each page type in the memory block a growing number of the hard errors based on a decoding failure of the read retry voltages to read the data from the memory block.

20. The method of claim 19, wherein in response to identifying a hard error in the memory block, relocating parts or a whole of the memory block to another memory block.

* * * * *